US006808450B2

(12) United States Patent
Snow

(10) Patent No.: US 6,808,450 B2
(45) Date of Patent: *Oct. 26, 2004

(54) SOLAR POWERED HEATING AND VENTILATION SYSTEM FOR VEHICLE

(76) Inventor: Christopher E. Snow, 10183 Green Meadow Dr., King George, VA (US) 22485

(*) Notice: Subject to any disclaimer, the term of this patent is extended or adjusted under 35 U.S.C. 154(b) by 0 days.

This patent is subject to a terminal disclaimer.

(21) Appl. No.: 10/721,244

(22) Filed: Nov. 26, 2003

(65) Prior Publication Data

US 2004/0110459 A1 Jun. 10, 2004

Related U.S. Application Data

(63) Continuation-in-part of application No. 10/309,214, filed on Dec. 4, 2002, now Pat. No. 6,692,130.

(51) Int. Cl.[7] .................................................. B60H 1/00
(52) U.S. Cl. ....................... 454/137; 454/139; 454/141; 454/159; 454/900
(58) Field of Search .......................... 454/75, 137, 139, 454/141, 145, 159, 900, 229, 236

(56) References Cited

U.S. PATENT DOCUMENTS

| | | |
|---|---|---|
| 3,943,726 A | 3/1976 | Miller |
| 4,939,986 A | 7/1990 | Turner |
| 4,942,806 A | 7/1990 | Hwang |
| 4,953,448 A | 9/1990 | Duh |
| 4,955,203 A | 9/1990 | Sundhar |
| 5,040,455 A | 8/1991 | Doi et al. |
| 5,081,912 A | 1/1992 | Clenet |
| 5,148,736 A | 9/1992 | Juang |
| 5,167,574 A | 12/1992 | Ikeda et al. |
| 5,205,781 A | 4/1993 | Kanno et al. |
| 5,205,782 A | 4/1993 | Ohba et al. |
| 5,248,278 A | 9/1993 | Fuerst et al. |
| 5,344,361 A | 9/1994 | Matthis |
| 5,433,660 A | 7/1995 | Ohba |
| 5,588,909 A | 12/1996 | Ferng |
| 6,158,225 A | 12/2000 | Muto et al. |
| 6,186,886 B1 | 2/2001 | Farrington et al. |
| 6,433,915 B2 | 8/2002 | Mounir |
| 6,435,961 B1 | 8/2002 | Biancone |
| 6,439,658 B1 | 8/2002 | Ganz et al. |
| 6,692,130 B1 * | 2/2004 | Snow .......................... 454/137 |

FOREIGN PATENT DOCUMENTS

| | | | |
|---|---|---|---|
| DE | 4437209 | | 8/1995 |
| DE | 10021807 | | 11/2001 |
| EP | 1024038 | | 8/2000 |
| GB | 2220738 A | | 1/1990 |
| JP | 1-145222 | | 6/1989 |
| JP | 2001-206046 A | | 7/2001 |
| KR | 2003047154 A | * | 6/2003 |
| SE | 468668 | | 3/1993 |

* cited by examiner

Primary Examiner—Jiping Lu
(74) Attorney, Agent, or Firm—Richard C. Litman

(57) ABSTRACT

A solar powered heating and ventilation system maintains an unoccupied vehicle at a more comfortable temperature relative to the outside temperature using both heating and cooling as appropriate. The system uses an air duct having a fan, heating element, vents, flaps, a selector switch, power control circuitry, a thermostat, and a clock/timer. The system also uses an electronic solar power panel and battery as power sources. The thermostat senses air temperature and causes the power control circuitry to regulate the temperature. The clock/timer may be manually set to activate and/or deactivate the power control circuitry at predetermined times. The system provides power to the fan and heating elements via a selector switch and power control circuits. The power control circuitry is connected to the vehicle battery and electronic solar power cells. The duct is located on the interior ceiling of the vehicle and has at least three vents.

20 Claims, 3 Drawing Sheets

SOLAR POWERED HEATING AND VENTILATION SYSTEM FOR VEHICLE

CROSS-REFERENCE TO RELATED APPLICATIONS

This application is a Continuation-In-Part of U.S. patent application Ser. No. 10/309,214, filed Dec. 4, 2002, now U.S. Pat. No. 6,692,130 which is incorporated herein by reference.

BACKGROUND OF THE INVENTION

1. Field of the Invention

The present invention relates to a system for maintaining an unoccupied vehicle at a more comfortable temperature relative to the outside temperature using both heating and cooling. The system uses an air duct with a fan, a heating element, vents, a solar panel, and other control elements.

2. Description of the Related Art

On warm or hot days with the sun up, a vehicle parked unoccupied in the sun will experience a greenhouse like heating effect that is much more uncomfortable for driver and passengers to tolerate when entering than if the vehicle was parked in the shade. Alternately, when the vehicle has been parked unoccupied on a cold night and/or day, the vehicle may be very uncomfortable for the driver and passengers to tolerate when entering.

In the prior art, systems for providing an unoccupied vehicle with a more comfortable temperature used systems for cooling and/or ventilating the vehicle using solar power and/or batteries as the power source and a fan for forcing the ventilation.

Exemplary references of this type are: U.S. Pat. No. 3,943,726 issued on Mar. 16, 1976 to John H. Miller; U.S. Pat. No. 4,498,457 issued on Feb. 12, 1985 to William Kreamer; U.S. Pat. No. 4,939,986 issued on Jul. 10, 1990 to Charles R. Turner; U.S. Pat. No. 4,942,806 issued on Jul. 24, 1990 to Feng-Lin Hwang; U.S. Pat. No. 4,953,448 issued on Sep. 4, 1990 to Gabri C. B. Duh; U.S. Pat. No. 4,955,203 issued on Sep. 11, 1990 to Shaam P. Sundhar; U.S. Pat. No. 5,040,455 issued on Aug. 20, 1991 to Shigetoshi Doi et al.; U.S. Pat. No. 5,081,912 issued on Jan. 21, 1992 to Alain J-M. Clent; U.S. Pat. No. 5,148,736 issued on Sep. 22, 1992 to William Juang et al.; U.S. Pat. No. 5,167,574 issued on Dec. 1, 1992 to Kazutoshi Ikeda et al.; U.S. Pat. No. 5,205,781 issued on Apr. 27, 1993 to Yoshihisa Kanno et al.; U.S. Pat. No. 5,205,782 issued on Apr. 27, 1993 to Shunji Ohba; U.S. Pat. No. 5,248,278 to issued on Sep. 28, 1993 to Arpad Fuerst et al.; and U.S. Pat. No. 5,344,361 issued on Sep. 6, 1994 to Jan H. Matthias.

Other exemplary references of this type are: U.S. Pat. No. 5,433,660 issued on Jul. 18, 1995 to Shunji Ohba et al.; U.S. Pat. No. 5,588,909 issued on Dec. 31, 1996 to Shing-Lai Ferng; U.S. Pat. No. 6,010,076 issued on Jan. 4, 2000 to Charles D. Wink; U.S. Pat. No. 6,147,295 issued on Nov. 14, 2000 to Toshihiko Mimura et al.; U.S. Pat. No. 6,158,225 issued on Dec. 12, 2000 to Ikuo Muto et al.; U.S. Pat. No. 6,186,886 B1 issued on Feb. 13, 2001 to Robert B. Farrington et al.; U.S. U.S. Pat. No. 6,201,313 B1 issued on Mar. 13, 2001 to Yoshiro Nakamats; U.S. Pat. No. 6,225,705 B1 issued on May 1, 2001 to Yoshiro Nakamats; U.S. Pat. No. 6,296,562 B1 issued on Oct. 2, 2001 to Yukio Uemura et al.; U.S. Pat. No. 6,435,961 B1 issued on Aug. 20, 2002 to Michael R. Biancone; U.S. Pat. No. 6,439,658 B1 issued on Aug. 27, 2002 to Thomas Ganz et al.; Japan Patent Application Publication No. 1-114522 published in June, 1989; Great Britain Patent Application Publication No. 2,220,738 A published in January., 1990; Sweden Patent Application Publication No. 468,668 published in March., 1993; Germany Patent 4,437,209 published in August, 1995; Europe Patent Application Publication No. 1,024,038 published in August, 2000; Japan Patent Application Publication No. 2001-20646 A published in July, 2001; and German Patent 1 002 1807 published in November, 2001.

In the above prior art systems, no device was provided for adding extra heat to circulated air inside the vehicle to make the interior of the vehicle more comfortable to enter during cold weather.

In another prior art system shown in U.S. Pat. No. 6,433,915 B2 issued on Aug. 13, 2002 to Ben F. Mounir, an unoccupied vehicle is maintained at a more comfortable temperature by providing a system using a complex film on the windows that changes state via electrical or temperature changes applied to the film, resulting in a change of color. The color changes serve to heat or cool the vehicle via reflection or absorption of sunlight. This prior art system implements a system to heat and cool the inside of the vehicle that is slow and which may not provide the amount of comfort level associated with the system in the present invention.

It would be desirable to have a system for maintaining an unoccupied vehicle at a more comfortable temperature by providing both heating and cooling using solar power and batteries as the power source and using an electric fan and a heater.

None of the above inventions and patents, taken either singly or in combination, is seen to describe the instant invention as claimed. Thus, a solar powered heating and ventilation system for vehicle solving the aforementioned problems is desired.

SUMMARY OF THE INVENTION

The present invention is a solar powered heating and ventilation system for maintaining an unoccupied vehicle at a more comfortable temperature relative to the outside temperature using both heating and cooling, as appropriate.

The system uses an air duct having an electric fan, an electric heater, vents, a flap controller and flaps. The system also uses a solar power panel, battery, thermostat, clock/timer, selector switch, and power control circuitry. The system provides power to the electric fan and electric heater via a selector switch and power control circuitry. The thermostat is located near the beginning of the intake duct of the duct system of the vehicle for sensing the temperature of air from the interior of the passenger compartment and causing the power control circuitry to regulate the temperature. The clock/timer may be manually set to activate and/or deactivate the power control circuitry at predetermined times. The duct is located on the interior ceiling of the vehicle and has at least three vents. The fan and heater are located inside the duct. The first input vent is located on one side of the fan and heater at the front of the vehicle and the other two vents and flaps are located on the other side of the fan and heater at the rear of the vehicle. One of the other two vents opens to the interior of the vehicle. A second of the other two vents opens to the exterior of the vehicle above the rear window.

When there is a need to cool the interior of the vehicle due to the heat of the sun acting on the vehicle as if it were a greenhouse, air enters the duct through the first input vent pulled by the fan mounted in the duct to the second of the other two vents opening at the exterior of the vehicle so that hot air can exit. Flaps in the first of the other two vents are pushed or pulled closed to close off the exit of air back into the vehicle. When there is a need to heat the insides of the vehicle due the lack of sun and cold outside temperatures, the interior vehicle air enters the duct through the first input vent pulled by the fan and pushed past active heating elements in the duct with air exiting at the first of the other two vents on the inside of the vehicle. Flaps in the first of the other two vents are pushed to close off the exit of air to the outside of the vehicle at the second of the other two vents. Thus, air is forced over the active heater and circulated back into the vehicle to warm the air inside the vehicle.

During the heating of the interior of the vehicle, battery power may be the most used source of power since the sun may not always be available or adequate when temperatures are low. Since the heater and the fan are both used and the heater requires so much more power than the fan, a power control circuit is used to regulate the power to the fan and heater. The power control circuit will, based on the current draw from the heater and fan, decide whether to provide power from the solar cells or battery or both. Also, it will prevent the battery from discharging so much that the vehicle cannot be started. It will also cut off all power for the heater and fan if neither power source can provide enough power. Also, the battery used may be the vehicle battery, or an auxiliary battery that does not provide power to any other parts of the vehicle.

Accordingly, it is a principal aspect of the invention to provide a system for maintaining an unoccupied vehicle at a more comfortable temperature relative to the outside temperature using both heating and cooling as appropriate.

It is another aspect of the invention to provide a system for maintaining an unoccupied vehicle at a more comfortable temperature using solar power and battery as power sources.

It is a further aspect of the invention to provide a system for maintaining an unoccupied vehicle at a more comfortable temperature using solar power and battery as power sources and using a controller to regulate power to the heater and fan which also prevents damaging discharge of the battery.

Still another aspect of the invention is to provide a system for maintaining an unoccupied vehicle at a more comfortable temperature using a duct system with flaps and vents for providing circulation and heating of excessively cold air or exhaustion of excessively hot air inside the vehicle.

It is an aspect of the invention to provide improved elements and arrangements thereof for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
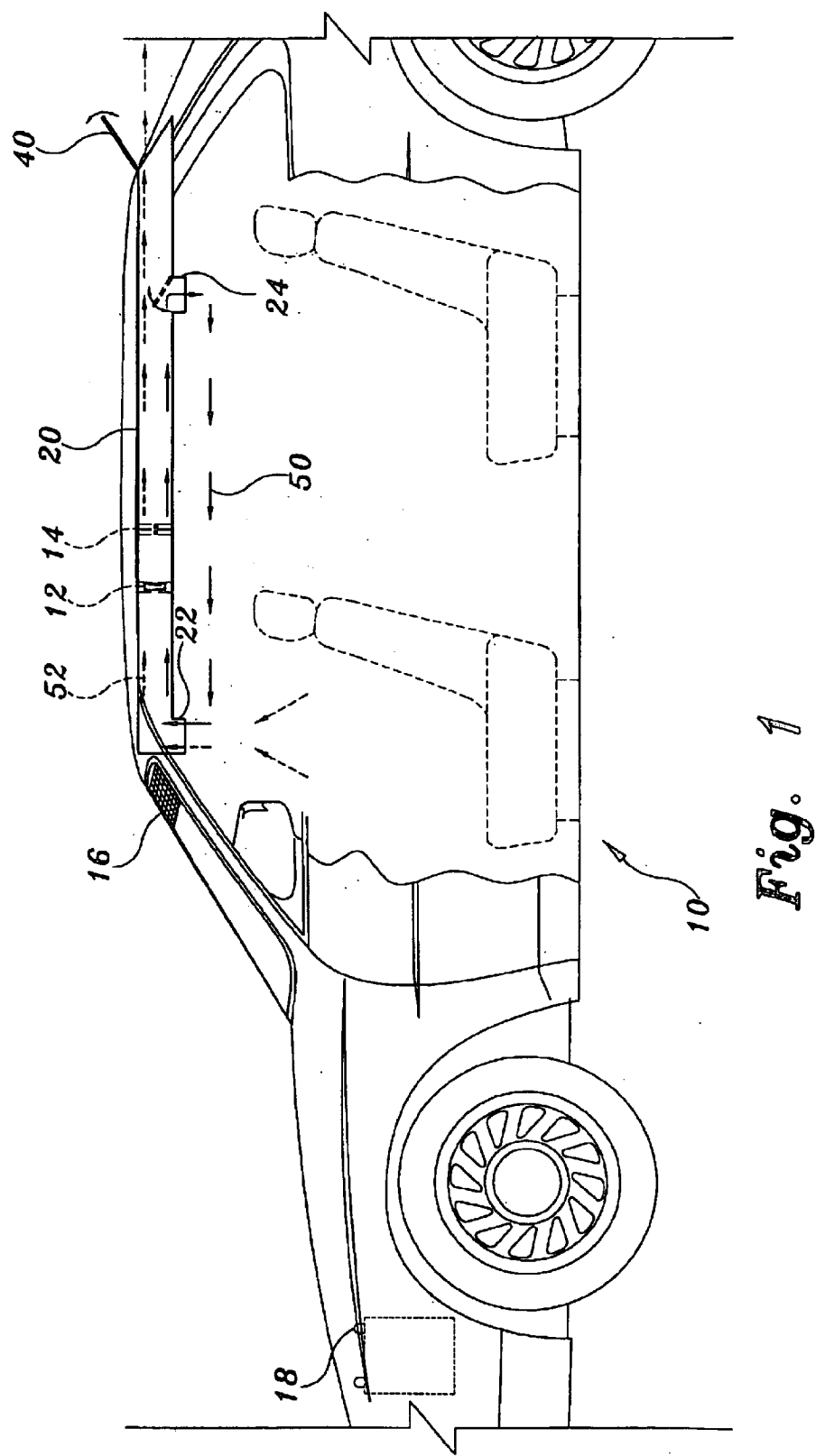
FIG. 1 is an environmental, perspective view of a solar powered heating and ventilation system for a vehicle according to the present invention.

The present invention is a solar powered heating and ventilation system. The invention disclosed herein is, of course, susceptible of embodiment in many different forms. Shown in the drawings and described herein below in detail is are preferred embodiments of the invention. It is to be understood, however, that the present disclosure is an exemplification of the principles of the invention and does not limit the invention to the illustrated embodiments.

Figure 2:
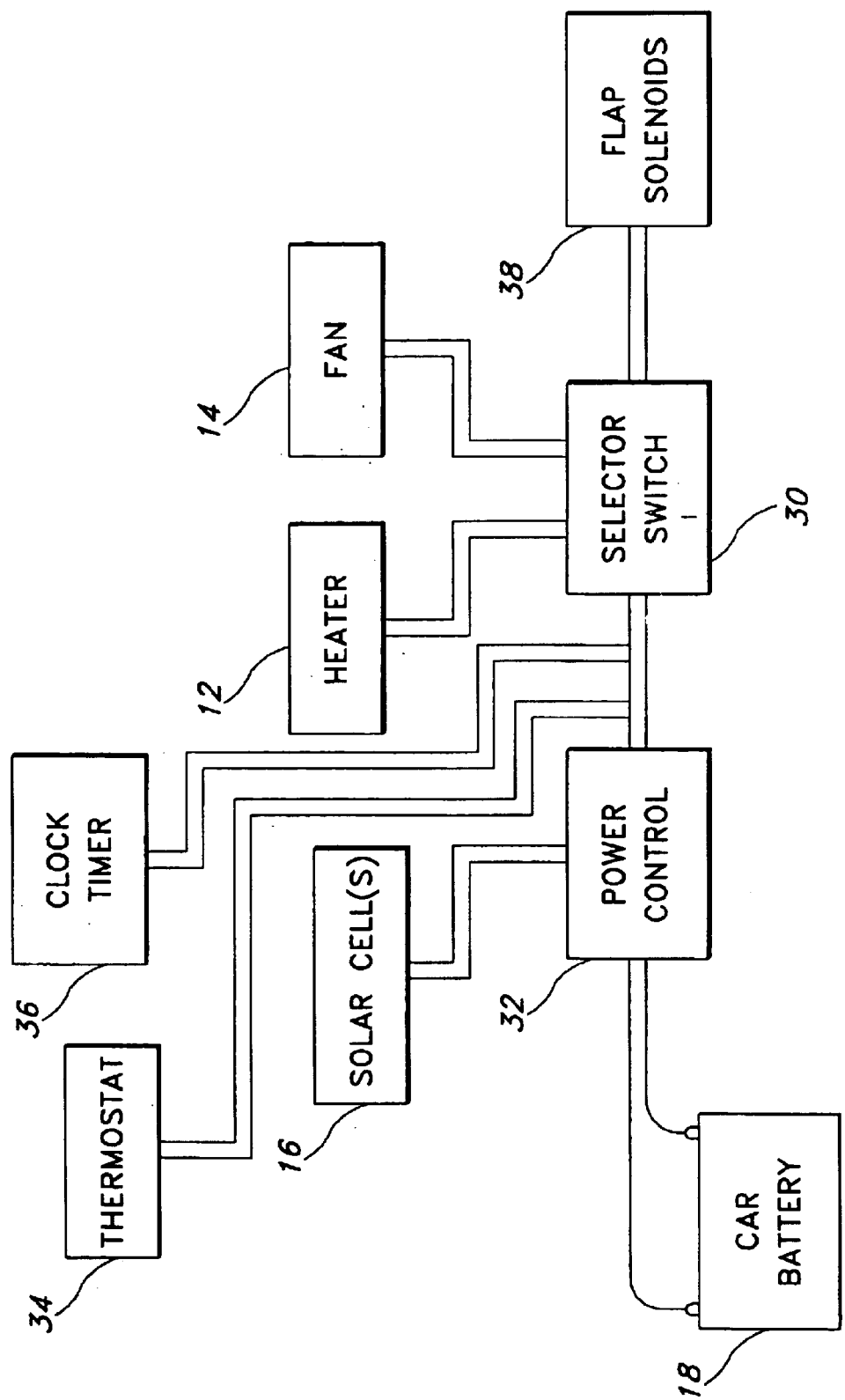
FIG. 2 is a block diagram of the solar powered heating and ventilation system according to the present invention.
Figure 3:
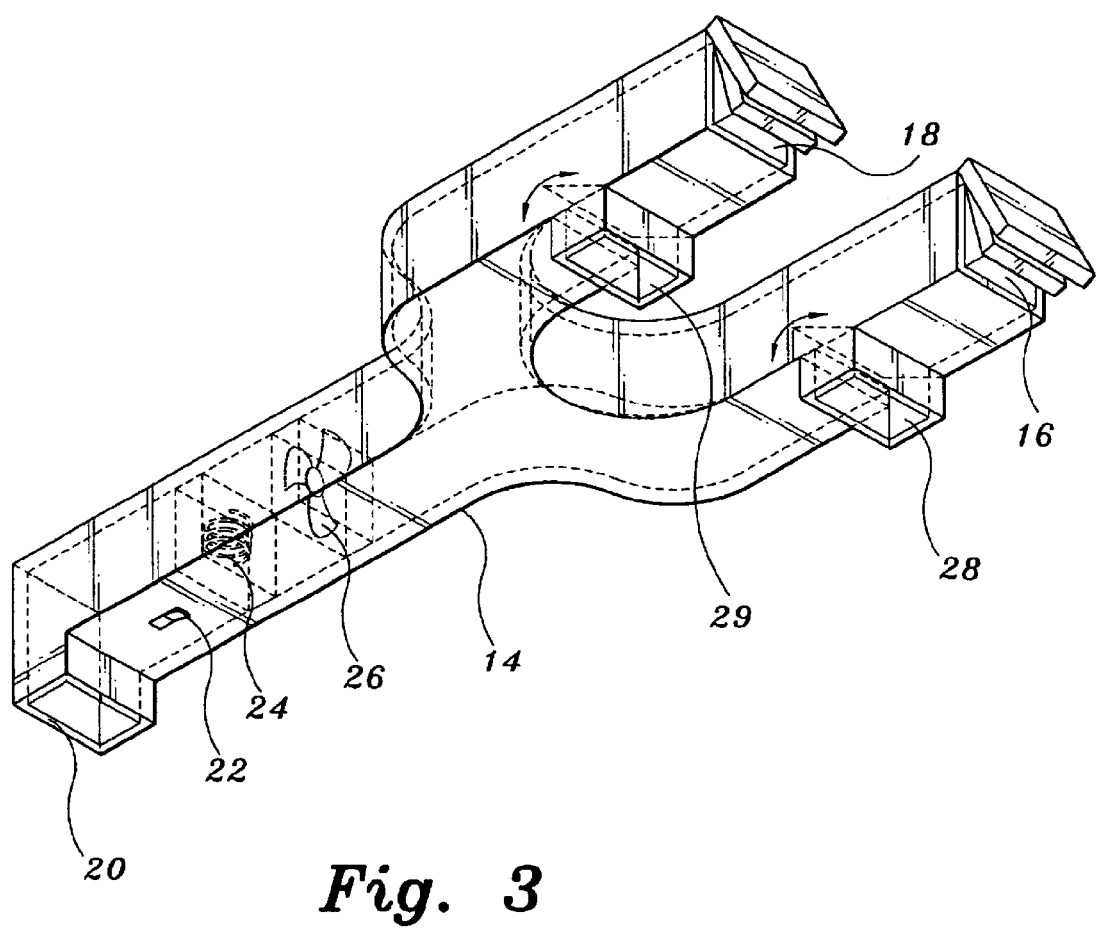
FIG. 3 is a perspective view of the duct and flap system according to the present invention.

Referring to the drawings, a system is shown in FIGS. 1–3 for providing an unoccupied vehicle 10 with a more comfortable temperature relative to the outside temperature using both heating with heater 12 and fan 14, and cooling with fan 14 only, which are mounted inside an air duct 20.

The air duct 20 has a front input vent 22 and rear vents 40 and 42 (see FIG. 3). The system also uses electronic solar power cells 16 and battery 10 as power sources.

The system provides power to the heater 12 and fan 14 via a selector switch 30 and power control circuitry 32 as shown in FIG. 2.

The power control circuitry 32 in FIG. 2 is connected to the vehicle battery 18 and electronic solar power cells 16 which provide the typical twelve volts DC. The battery 18 can be the sole battery in the vehicle 10, or a deep cycle auxiliary battery can be provided which does not provide power to any other parts of the vehicle 10. Both batteries may be charged by the engine of the vehicle 10. In addition, the solar power cells 16 may provide charge to both batteries when the vehicle 10 is turned off. The heater 12 and fan 14 are chosen to use the typical twelve volts DC power available in most vehicles and trucks.

During the heating of the interior of the vehicle 10, power from battery 18 may be the most used source of power since the sun may not always be available or adequate when ambient outside temperatures are low. Also, the solar power cell(s) 16 often do not provide as much power as the battery 18 or as much power as needed by the heater 12. When heating, the heater 12 and the fan 14 are both used and the heater 12 requires much more power than the fan 14. In such a case, the battery 18 or combination of battery 18 and solar power cell(s) 16 may provide enough power for the heater 12 and fan 14. During cooling of the interior of the vehicle 10 only the power required by the fan 14 is needed. In such a case, the solar power cell(s) 16 may provide enough power for fan 14. During both heating and cooling there may be some electrical power needed for changing the position of electrically operated flaps via flap solenoids 38 on the vents 40 and 42. Therefore, the power control circuitry 32 is used to regulate the power to the heater 12, fan 14, and electrically operated flaps 38. The power control circuitry is used in conjunction with a thermostat 34 and a clock/timer 36. The thermostat 34 is located near the beginning of the intake duct of the duct system 20 of the vehicle for sensing the temperature of air from the interior of the passenger compartment and causing the power control circuitry 32 to regulate the temperature. The clock/timer 36 may be manually set to activate and/or deactivate the power control circuitry 32 at predetermined times according to the desires of the user.

First, the power control circuitry 32 prevents the battery 18 from going into a deep discharge. A deep discharge of the battery 18 could prevent the battery 18 from being charged and could prevent the vehicle 10 from starting, if the battery 18 is the only battery in the vehicle 10. The power control circuitry 32 prevents the deep discharge by cutting off power supplied by the battery 18 to the system, before the deep discharge state occurs by sensing the discharge state of the battery 18.

Second, the power control circuitry 32 decides whether to supply power to the heater 12 and/or fan 14 from either the solar cell(s) 16 or the battery 18 or both the solar cell(s) 16 and battery 18 based on the sensed amperage needed by the heater 12 and fan 26 and based on the sensed amperage available from the solar cell(s) 16 and battery 18. Therefore, the power control circuitry 32 has voltage and amperage sensors, control relays and a controller. The power control circuitry 32 could also use information from the selector switch 30, so that it knows whether cooling or heating has been selected, since cooling uses less power than heating.

Third, the power control circuitry 32 may decide when to provide power from the vehicle battery 18 or the auxiliary battery.

The selector switch 30 provides several functions. It allows the user who is about the leave the vehicle 10 unoccupied for a while to select between a cooling and heating operation of the system.

When set to cooling operation, the switch 30 will turn on only the fan 14 and operate flaps mechanically or electrically so that the flaps for vents 24 and 26 close and the flaps for vents 40 and 42 open as shown in FIGS. 1 and 3.

When set to heating operation, the switch 30 will turn on the heater 12 and fan 14 and operate flaps mechanically or electrically so that the flaps for vents 24 and 26 are open and the flaps for vents 40 and 42 are closed as shown in FIGS. 1 and 3.

In the case of mechanical operation of the flaps, the switch 30 is an electrical switch that is connected mechanically to the flaps with levers or rods. In case of electrical operation of the flaps, switch 30 is connected to flap solenoid 38 that pulls open or closed the appropriate flap or set of flaps in vents 24 or 40. It is also possible for the switch 30 to control the flow of vacuum to vacuum operated levers to open and close the flaps in the other vents 26 or 42.

As shown in FIGS. 1 and 3, the duct system 20 is located on the interior ceiling of the vehicle 10 and has at least three vents. The duct system 20 may be located above the head liner of the ceiling of the vehicle 20, with the vents 22, 24 and 26 mounted through holes in the head liner. The first vent 22 is located on one side of the heater 12 and fan 14, usually toward the front of the vehicle 10. The first vent 22 needs no flap and provides recirculated heated air intake 50 from the interior of the vehicle 10 to the heater 12 and fan 14. The first vent 22 also provides air intake 52 of hot air to be exhausted from the interior of the vehicle 10 to the fan 14 during cooling. The first input vent 22 may have a filter to prevent dust and dirt accumulation on the heater 12, which might ignite and start a fire.

In FIG. 1 a first rear vent and flap 24 is located on an opposite side of the heater 12 and fan 14 inside the vehicle 10, further down the length of the duct 20 and usually toward the rear of the vehicle 10. When the rear vent flap 24 is forced open during heating, air flow 50 heated by heater 12 and pushed by fan 14 is recirculated from the first or front vent 22 to be heated further by heater 12 so that the temperature of the vehicle 10 may increase. Also, when right rear vent flap 24 is electrically or mechanically forced open during heating and the flap 24 is positioned, sized and hinged as shown, it will block air flow 52 from being exhausted out the rear exterior vent 40 and outside of the vehicle 10. In addition, when rear vent flap 24 is electrically or mechanically forced open during heating, the rear exterior vent flap 40 can be electrically or mechanically forced closed so air flow 52 is further prevented from being exhausted out the rear exterior of the vehicle 10.

When the rear vent flap 24 is forced closed during cooling, hot air flow 52 input by front vent 22 is forced by fan 14 to the rear exterior vent 40 and recirculated air flow 50 stops flowing. Also, when the rear vent flap 24 is electrically or mechanically forced closed during cooling, a flap in the rear exterior vent 40 can be electrically or mechanically forced open so that air flow 52 is exhausted outside vehicle 10 through vent 40.

As shown in FIG. 1, front vent 22 and rear vent 24 are located as openings at the bottom of the duct 20 in the interior of vehicle 10. Rear exterior vent and flap 40 is located just below the roof and above the rear window of the vehicle 10 for exhausting hot interior air.

Because rear vent flap 24 can be positioned, sized and hinged as shown to provide almost 100% control over the heating and cooling air flows 50, 52, the flap in the rear exterior vent 40 does not require mechanical (levers or rods) or electrical operation (flap solenoid 38 in FIG. 2) controlled by the selector switch 30. On the other hand, the flap in exterior vent 40 is needed to keep the rain and dust outside of the vehicle 10 from coming in the duct 20. Therefore, the flap in exterior vent 40 may be a fixed grill like louver, or a passively moved (via air flow 52 and fan 14) hinged flap.

In FIG. 3 another embodiment of the duct system 14 is shown. Instead of the rear vents 24 and 40 on the opposite side of the heater 12 and fan 14, the duct system 20 splits or forks off into two parts that lead further to two sets of rear vents 24, 26, 40, 42. The whole duct system 20 forms a 'Y' shape. The two vents and flaps 24, 26 are located on the other side of the heater 12 and fan 14 further down the forked sections of duct 20, but still in the interior of the vehicle 10. The vent flaps 24 and 26 open to allow air flow 50 into the interior of the vehicle 10 and provide circulation of air forced by fan 14 back inside the vehicle 10 to the front vent 20 and heater 24 during heating (see air flow 50 in FIG. 1).

During cooling, the two vent flaps 24 and 26 close so that hot interior air input through vent 22 is exhausted out to the exterior of the vehicle 10 at the two open vent flaps 40 and 42 (see air flow 52 in FIG. 1). The rearmost vents and flaps 40 and 42 are located at the end of the two parts of duct 20 and open to the exterior of the vehicle 10 and are located just below the roof and above the rear window of the vehicle 10 for exhausting hot interior air.

Optionally, flaps in vents 40 and 42 are not needed, if the flaps in each of vents 24 and 26 are hinged and positioned in duct system 20 as shown in FIG. 3. During heating selected by selector switch 30, if the flaps in vents 24 and 26 are opened all the way until their edges reach the top of the duct system 20 and cover the area of duct 20 leading to the vents 40 and 42 further along the duct 20, then the flaps in vents 24 and 26 will effectively prevent air from flowing back to exterior vents 40 and 42 and let all interior air back into the vehicle 10 through interior vents 24 and 26. During cooling selected by selector switch 30, if the flaps in vents 24 and 26 are closed all the way and covering the opening of vents 24 and 26, then the flaps in vents 24 and 26 will effectively prevent interior air from flowing back into the vehicle 10 and all interior air will exhaust to the outside of the vehicle 10 via the vents 40 and 42.

Therefore, flaps in vents 40 and 42 in this example, do not need to be controlled by selector switch 30. Instead flaps in vents 40 and 42 can be fixed louvers or loose hinged flaps, so that they keep rain and dust from the outside of the vehicle 10 from entering the duct system 20.

In operation, when a user realizes a need to cool the interior of the vehicle 10, while it sits unoccupied, he sets the selector switch 30 to the cooling position before leaving the vehicle 10. In the cool position the selector switch 30 allows only the fan 14 to operate and mechanically (using levers) or electrically (flap solenoid 38 in FIG. 2) opens flaps in vents 40 and 42 and closes flaps in the vents 24 and 26. Then hot interior air flow 52 enters the duct 20 through the first vent 20 pulled by the fan 14 mounted in the duct system 20 to the open flaps in rear vents 40 and 42 external to the vehicle 10 so that air flow 52 can be exhausted out the vehicle 10. Closed flaps 24 and 26 close off the exit of air flow 52 back into the interior of the vehicle 10.

In operation, when the user realizes there is a need to heat the insides of the vehicle 10 while unoccupied due to some lack of sun and cold outside temperatures, he sets the selector switch 30 to the heating position before leaving the vehicle 10. In the heating position the selector switch 30 allows the heater 12 and fan 14 to operate and mechanically (using vacuum or levers) or electrically (flap solenoid 38 in FIG. 2) closes flaps in vents 40 and 42 and opens flaps in vents 24 and 26. Air flow 50 from inside the vehicle 10 enters the duct 20 through the front vent 22 pulled in by the fan 14 and pushed past active heating elements of heater 12. Air flow 50 exits at the open flaps in vents 24 and 26 back into the interior of the vehicle 10. The flaps in vents 40 and 42 are forced to close off the exit of air flow 50 or 52 to the outside of vehicle 10 and prevent rain and dust from outside the vehicle 10 from entering the duct 20. Thus, inside air flow 50 is forced over the fan 12 and heater 13 and back into the interior of vehicle 10 to warm and rewarm the inside air flow 50 of the vehicle 10.

While the invention has been described with references to its preferred embodiment, it will be understood by those skilled in the art that various changes may be made and equivalents may be substituted for elements thereof without departing from the true spirit and scope of the invention.

I claim:

1. A solar powered heating and cooling system for a vehicle comprising:
   a duct system mounted on a ceiling of the vehicle;
   a fan mounted inside of said duct system;
   a heater mounted inside of said duct system;
   a first vent mounted at a front end of said duct system away from said fan and said heater for accepting air input from an interior of the vehicle, said duct system extending away from a position of said fan and said heater to a rear of said vehicle;
   a second and third vent and flap assembly mounted in a section of said extended duct system inside the vehicle for circulating air input from said first vent back into the vehicle interior at said second vent and preventing air from exhausting out the third vent during heating while said flap is in an open position;
   said third vent being mounted in a rear end of said extended duct system for exhausting air input from said first vent out of said vehicle at said third vent while said flap is in a closed position covering said second vent during cooling;
   a power controller;
   a battery coupled to said power controller as a power source;
   solar power cells coupled to said power controller as a power source;
   a thermostat coupled to said power controller to sense a temperature of air in the vehicle;
   a clock/timer coupled to said power controller to activate/deactivate the power controller at predetermined times;
   a selector switch coupled to said power controller to receive electrical power and electrically coupled to said fan and said heater, said selector switch being configured to select a heating operation by providing power to said fan and said heater and said selector switch being configured to select a cooling operation by providing power to said fan;
   said selector switch controlling the opening and closing of said flap; and
   said power controller being configured to regulate power provided to said selector switch.

2. A solar powered heating and cooling system for a vehicle as claimed in claim 1, wherein said third vent further includes a flap to passively provide protection for said duct system from rain and dust external to said vehicle.

3. A solar powered heating and cooling system for a vehicle as claimed in claim 2, wherein said power controller is configured to select power from one of said battery and said solar power cells and both based on current needed by said fan and said heater during heating or cooling as selected by said selector switch.

4. A solar powered heating and cooling system for a vehicle as claimed in claim 3, wherein said power controller is configured to prevent deep discharge of said battery.

5. A solar powered heating and cooling system for a vehicle as claimed in claim 2, wherein said battery is an auxiliary battery that does not provide power to other parts of said vehicle and said power controller is configured to select power from one of said auxiliary battery and said solar power cells and both based on current needed by said fan and said heater during heating or cooling as selected by said selector switch.

6. A solar powered heating and cooling system for a vehicle as claimed in claim 5, wherein said power controller is configured to prevent deep discharge of said auxiliary battery.

7. A solar powered heating and cooling system for a vehicle as claimed in claim 1, wherein said third vent further includes a flap controlled by said selector switch to open and exhaust interior air during cooling when said flap on said second vent is closed and said flap on said third vent is controlled by said selector switch to close during heating while said flap on said second vent is open.

8. A solar powered heating and cooling system for a vehicle as claimed in claim 7, wherein said power controller is configured to select power from one of said battery and said solar power cells and both based on current needed by said fan and said heater during heating or cooling as selected by said selector switch.

9. A solar powered heating and cooling system for a vehicle as claimed in claim 8, wherein said power controller is configured to prevent deep discharge of said battery.

10. A solar powered heating and cooling system for a vehicle as claimed in claim 7, wherein said battery is an auxiliary battery that does not provide power to other parts of said vehicle and said power controller is configured to select power from one of said auxiliary battery and said solar power cells and both based on current needed by said fan and said heater during heating or cooling as selected by said selector switch.

11. A solar powered heating and cooling system for a vehicle as claimed in claim 10, wherein said power controller is configured to prevent deep discharge of said auxiliary battery.

12. A solar powered heating and cooling system for a vehicle comprising:
   a duct system mounted on the ceiling of said vehicle;

a fan mounted inside of said duct system;

a heater mounted inside of said duct system;

a first vent mounted at a front most end of said duct system away from said fan and said heater for accepting air input from an interior of said vehicle;

said duct system splitting off into two sections extending away from a position of said fan and said heater and going back toward the rear of said vehicle;

a second vent and flap assembly in a first of said two sections within said extended duct inside said vehicle and a third vent and flap assembly in a second of said two sections within said extended duct inside said vehicle for circulating air input from said first vent back into said vehicle interior at said second and third vent and while said flaps in said second and third assemblies are in an open position and prevent air from exhausting out a fourth and fifth vent during heating;

said fourth vent mounted at a rear most end of said first of said two sections within said extended duct system and said fifth vent mounted at a rear most end of said second of said two sections within said extended duct system for exhausting air input from said first vent out at said fourth and fifth vent of said vehicle while said flaps in said second and third assemblies cover said second and third vent during cooling;

a battery coupled to a power controller as a power source;

solar power cells coupled to said power controller as a power source;

a thermostat coupled to said power controller to sense a temperature of air in the vehicle;

a clock/timer coupled to said power controller to activate/deactivate the power controller at predetermined times;

a selector switch coupled to said power controller to receive electrical power and coupled to said fan and said heater;

said selector switch configured to select a heating operation by providing power to said fan and said heater and said selector switch configured to select a cooling operation by providing power to said fan;

said selector switch controlling the opening and closing of said flaps of said second and third assemblies; and said power controller being configured to regulate power provided to said selector switch.

13. A solar powered heating and cooling system for a vehicle as claimed in claim 12, wherein said fourth vent includes a flap and said fifth vent includes a flap both controlled by said selector switch to open and exhaust interior air during cooling when said flaps on said second vent and third vents are closed and said flaps on said fourth and fifth vent are controlled by said selector switch to close during heating while said flaps on said second and third vent are open.

14. A solar powered heating and cooling system for a vehicle as claimed in claim 13, wherein said power controller is configured to select power from one of said battery and said solar power cells and both based on current needed by said fan and said heater during heating or cooling as selected by said selector switch.

15. A solar powered heating and cooling system for a vehicle as claimed in claim 14, wherein said power controller is configured to prevent deep discharge of said battery.

16. A solar powered heating and cooling system for a vehicle as claimed in claim 12, wherein said fourth and fifth vents each include a flap to passively provide protection for said duct system from rain and dust external to said vehicle.

17. A solar powered heating and cooling system for a vehicle as claimed in claim 16, wherein said power controller is configured to select power from one of said battery and said solar power cells and both based on current needed by said fan and said heater during heating or cooling as selected by said selector switch.

18. A solar powered heating and cooling system for a vehicle as claimed in claim 17, wherein said power controller is configured to prevent deep discharge of said battery.

19. A solar powered heating and cooling system for a vehicle comprising:

a duct system mounted on a ceiling of said vehicle;

a fan mounted inside of said duct system;

a heater mounted inside of said duct system;

a first vent mounted at a front most end of said duct system away from said fan and said heater for accepting air input from an interior of said vehicle;

said duct system extending from a position of said fan and said heater to a rear of said vehicle;

a second vent and flap assembly mounted in a section of said extended duct system inside said vehicle for circulating air input from said first vent back into said vehicle interior at said second vent and said flap of said second assembly opens and prevents air from exhausting out a third vent during heating;

said third vent and flap assembly mounted at a rear most end of said duct system in said extended duct system for exhausting air input from said first vent out of said vehicle through said flap of said third vent while said flap of said second assembly closes and covers said second vent during cooling;

a battery coupled to a power controller as a power source;

solar power cells coupled to said power controller as a power source;

a thermostat coupled to said power controller to sense a temperature of air in the vehicle;

a clock/timer coupled to said power controller to activate/deactivate the power controller at predetermined times;

a selector switch coupled to said power controller to receive electrical power and coupled to said fan and said heater to select between a heating or a cooling operation;

said selector switch controlling an opening and closing of said second and third flaps; and said power controller being configured to regulate power provided to said selector switch.

20. A solar powered heating and cooling system for a vehicle as claimed in claim 19, wherein said power controller is configured to select power from one of said battery and said solar power cells and both based on current needed by said fan and said heater during heating or cooling as selected by said selector switch and wherein said power controller is configured to prevent deep discharge of said battery.

* * * * *